Figure 3:
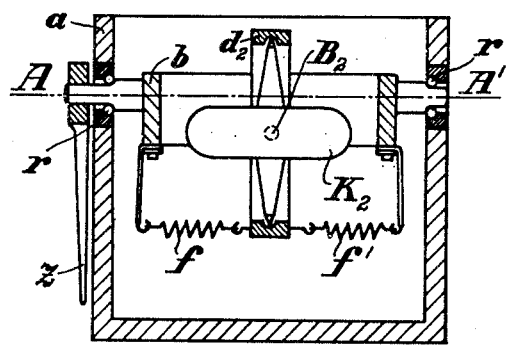

Nov. 12, 1929.  M. SCHULER  1,735,058
GYROSCOPIC APPARATUS FOR EXTENDING THE PERIOD OF OSCILLATION OF BODIES
Filed Aug. 26, 1924  5 Sheets-Sheet 1
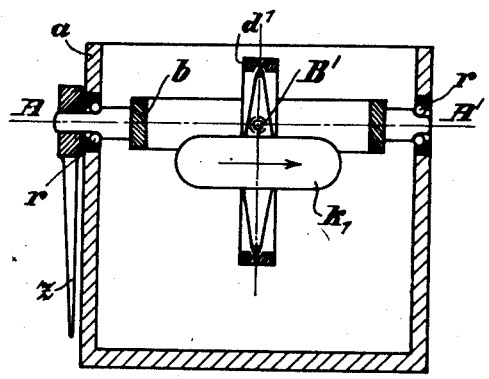
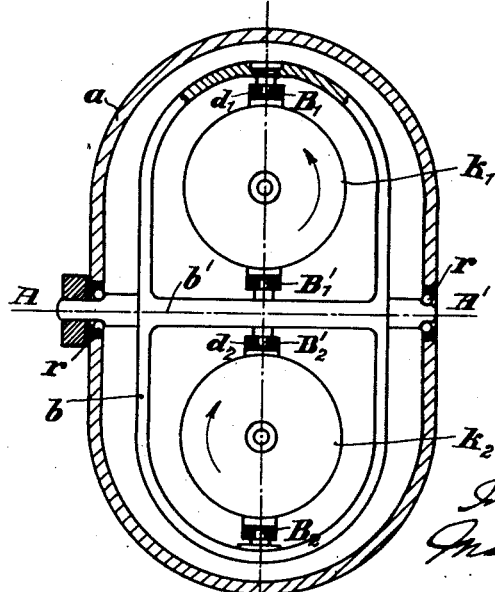

UNITED STATES PATENT OFFICE

MAX SCHULER, OF GOTTINGEN, GERMANY

GYROSCOPIC APPARATUS FOR EXTENDING THE PERIOD OF OSCILLATION OF BODIES

Application filed August 26, 1924. Serial No. 734,327, and in Germany August 29, 1923.

My invention relates to improvements in gyroscope devices for extending the period of oscillation of bodies suspended at a point above their centre of gravity and therefore turned into a certain position by gravity, for instance pendulums. Such bodies are in particular, leads and artificial horizons, and their object is to remain steady in spite of the oscillations of the place on which they are mounted, for instance a rolling ship or a circling aeroplane, and to indicate the vertical as it exists on the earth. Devices of this kind with a plurality of gyroscopes, which revolve in opposite directions, are already known but have the drawback that they possess an error of indication caused by a rotation of the direction of gravity in the space. Such rotations are caused in the first instance by the rotation of the earth and to a lesser extent by the speed of the vessel or aeroplane upon which the body is mounted.

In order to eliminate this drawback, my invention consists in connecting the gyroscopes with the body by intermediate members in such a manner that the gyroscopes are obliged to follow the rotations of the body in the vertical plane to be stabilized but are free to perform their precessional movements in the plane at right angles to the said vertical plane and laid through the axis of gyroscope and are turned into their normal position in this plane by momenta of forces which are so chosen that the sum of the angular momenta of all the gyroscopes becomes zero.

If the precessional movements of the gyroscopes take place in opposite directions, the apparatus is preferably so designed that momenta of friction are produced by the intermediate members which damp the oscillations of the gyroscopes and thus also the oscillations of the body. The essential advantage of this damping action consists in the fact that the pendulum speedily comes to rest again after an impulse without the accuracy of its adjustment being impaired in any way as would be the case if the friction were set up in the suspension joints of the pendulum. If the friction in the joints of the gyroscope should not suffice, it may be still further increased by special braking devices.

Several embodiments of my invention are diagrammatically illustrated in the drawings affixed to this specification and forming part thereof. In the drawings is:—

Figure 4:
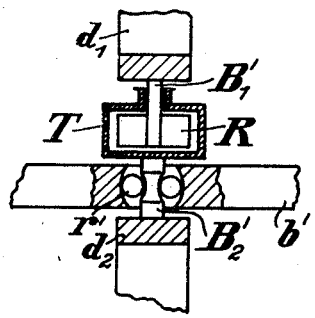

Fig. 1, a horizontal longitudinal section through a device in which a pendulum indicates the vertical by means of two gyroscopes revolving in opposite directions, Fig. 2, a vertical cross-section through the device according to Fig. 1, Fig. 3 a vertical cross-section similar to Fig. 2 of a modification of the construction according to Figs. 1 and 2, Fig. 4, a horizontal section through braking means suitable for damping the oscillations of the gyroscopes.

Figure 11:
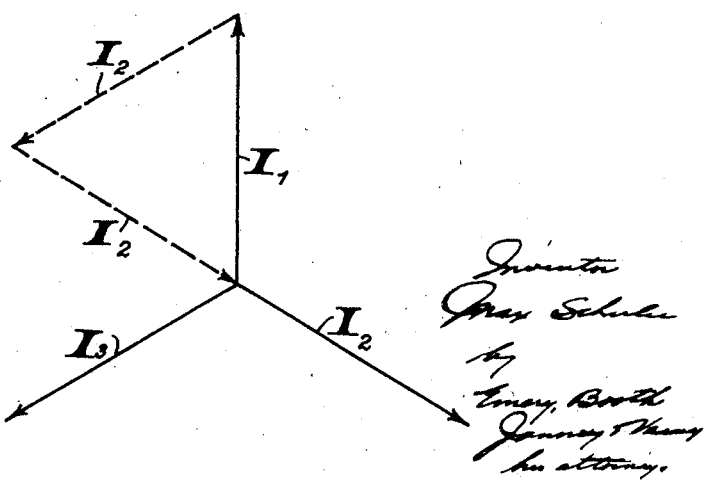
Figure 6:
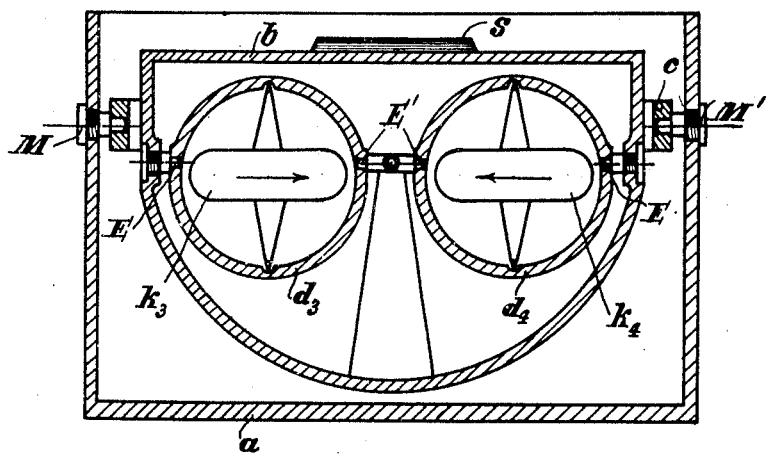
Figure 5:
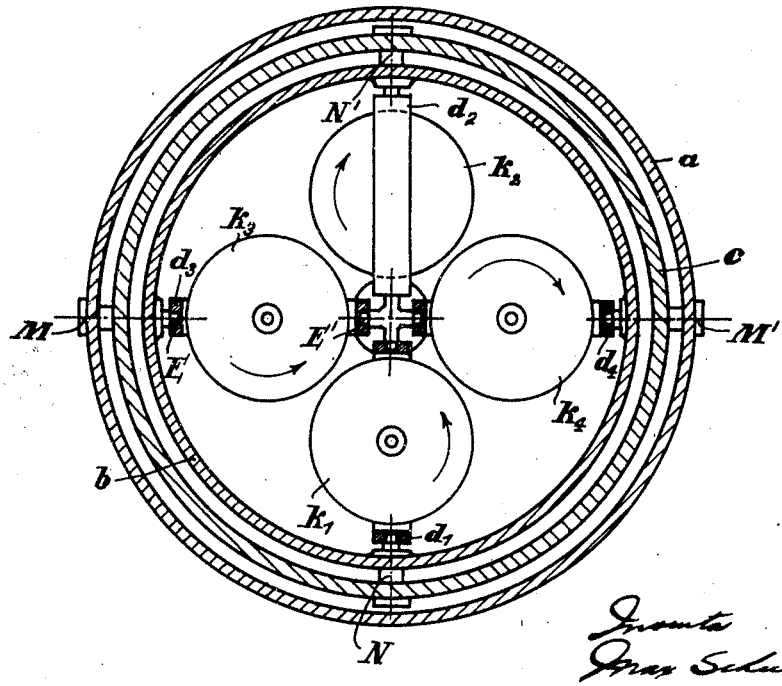
Figure 8:
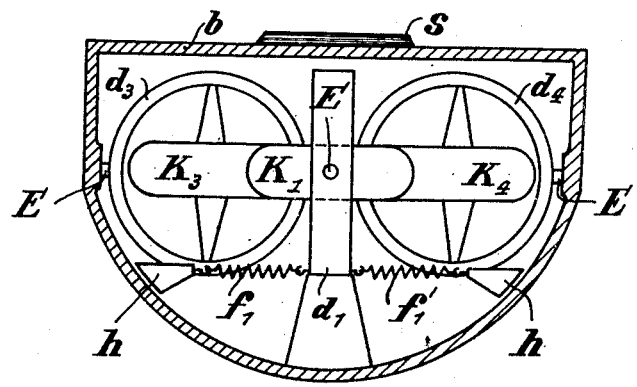
Figure 7:
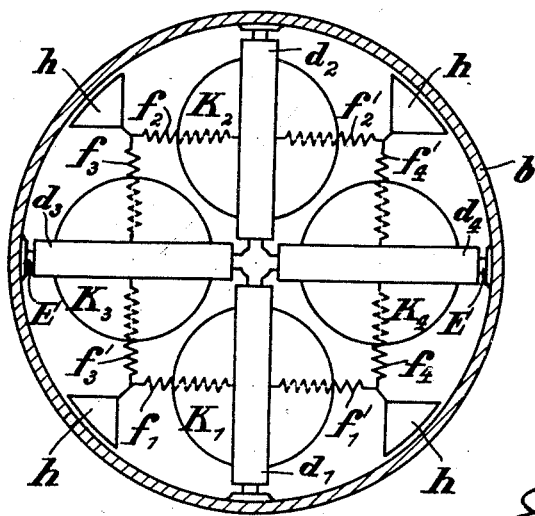
Figure 10:
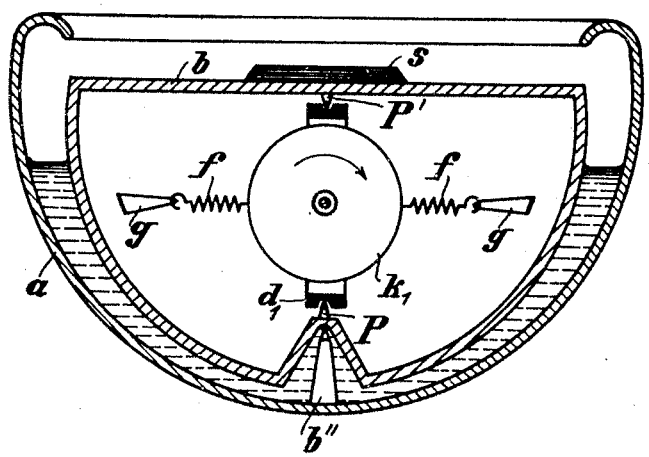
Figure 9:
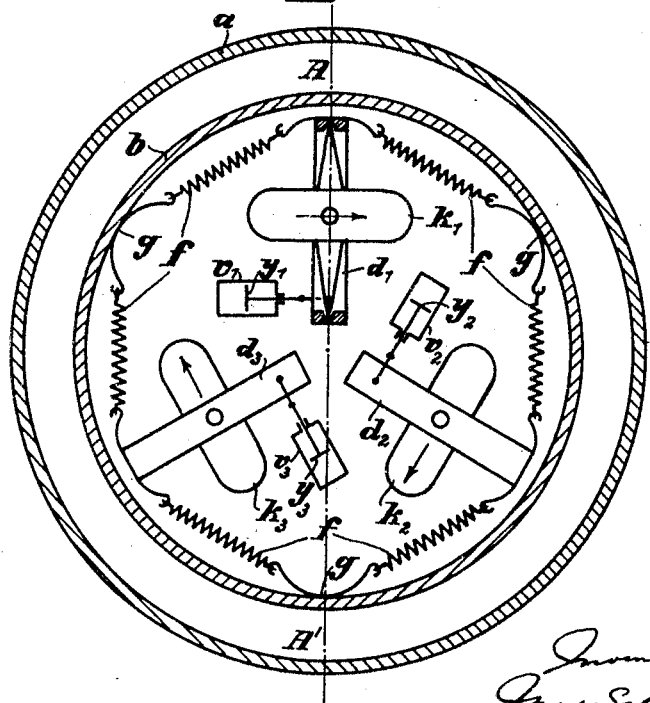

Fig. 5, a horizontal section through a device in which a mirror is maintained in a horizontal position by four gyroscopes which in pairs revolve in opposite directions, Fig. 6, a vertical cross-section through the device according to Fig. 5, Fig. 7, a horizontal section through a part of a modification of the construction illustrated in the Figs. 5 and 6, Fig. 8, a vertical cross-section of the device according to Fig. 7, Fig. 9, a horizontal section through a device in which a mirror is maintained in a horizontal position by means of three gyroscopes revolving in the same direction, Fig. 10, a vertical cross-section through the device according to Fig. 9, and Fig. 11, a diagram illustrating the manner of operation of the device according to Figs. 9 and 10.

Similar parts are indicated by similar letters of reference throughout all the figures of the drawings.

For the sake of simplifying the illustration of the invention and facilitating the description, gyroscopes have in all devices been shown which are rotated in the well-known and therefore not illustrated manner by driving cords or straps.

Generally electrically driven gyroscopes will however be employed. The electric drive of gyroscopes is likewise well known in this art and for instance described in the German Patent No. 235,749. As is also well known the supply of the electric current by way of the bearings of the suspension must take place with as little friction as possible, and liquid contacts as disclosed in the German Patent No. 245,433 may, for instance, be employed for this purpose.

The Figs. 1 and 2 relate to a pendulum for indicating the vertical in the plane at right angles to the axis A—A'. For this purpose, the frame $b$ is suspended within the casing $a$ by means of ball-bearings $r$ so that it is free to oscillate around the axis A—A'. The position of the pendulum can be read off by means of a pointer $z$ fixed upon the spindle of the frame $b$. A telescope, a mirror or any other suitable device for indicating the position of the pendulum may, however, be connected with the frame $b$. In the frame $b$ are disposed two similar gyroscopes $k^1$ and $k^2$ with vertical spindles which revolve with equal speed in opposite directions. Each gyroscope is journaled in a frame or ring $d^1$, $d^2$ by means of point bearings, and these frames are in their turn fulcrumed in the frame $b$ and its transverse piece $b'$ by means of trunnions $B_1$, $B_1'$ and $B_2$, $B_2'$ producing a damping friction. The arrangement is such that the impulses (moment of inertia multiplied by the angular speed) of the two gyroscopes revolving in opposite directions compensate each other and the gyroscopes are obliged to take part in the movements of the pendulum $b$ in the plane to be stabilized, but are on the other hand free to execute their precessional movements independent of each other in the vertical plane at right angles to the plane to be stabilized. In order that the gyroscopes may, after a disturbance, always return into their proper position with vertical rotation axis, the centre of gravity of the frames $d$ is preferably disposed a certain distance below the suspension trunnions B as shown in Fig. 2. In this way, the pendulum as a unit behaves as if no gyroscopes existed and only the mass of the pendulum had increased. If an impact acts upon the gyroscopes tending to move them around the trunnions $B_1$, $B_2$, they will oscillate around the axes of these trunnions as if they were not running because they cannot perform their opposite precessional movements. Their position in relation to the axis A—A' is not disturbed. If on the other hand an impact acts upon the gyroscopes tending to move them around the axis A—A', each gyroscope can by itself perform its precessional movement around the trunnions $B_1$ and $B_2$. The pendulum $b$ with the pointer $z$ does not give way to the impact but is stabilized by the gyroscopes and its period of oscillation is correspondingly extended.

If the axes A—A' are disposed in the direction of the meridian, a rotation around the axis A—A' takes place owing to the rotation of the earth. The gyroscopes revolve around the axes $B_1$, $B_2$, by equal opposite angles until the precessional speed around the trunnions A—A' corresponds with the rotation of the earth. An error is not caused thereby, as no indication takes place for the rotation around the trunnions $B_1$, $B_2$. If on the other hand the axis A—A' is disposed in the direction from east to west, the rotation of the earth takes place around the axis $B_1$, $B_2$. The gyroscopes can then not perform their opposite precessional movements around the axis A—A', and the indication of the pointer $z$ is not disturbed. In this manner, disturbances owing to the rotation of the earth are effectively eliminated in the construction of the apparatus illustrated in the Figs. 1 and 2.

For returning the frames $d$ into the vertical position, other forces, for instance springs, may be employed as shown in Fig. 3. In this case, the rings $d^1$ and $d^2$ are suspended in their centre of gravity, and the vertical direction of the gyroscope axes is brought about by two springs $f$ and $f'$ for each gyroscope which springs are stretched between the rings $d$ and the frame $b$, as clearly shown in Fig. 3. Otherwise, the arrangement and the manner of operation of the apparatus is the same as in the apparatus illustrated in the Figs. 1 and 2.

In order to increase the friction of the trunnions B of the frames $d$ required for damping the oscillations, a special liquid brake may be employed. Such a brake is illustrated by way of example in Fig. 4 for the trunnions $B_1'$ and $B_2'$ of the Fig. 1. The trunnion $B_2'$ of the frame $d_2$ is journaled in the transverse piece $b'$ of the pendulum frame $b$ by means of ball-bearing $r'$ and projects through said transverse piece. At its projecting end, it carries a drum T which is filled with a liquid, preferably oil. The trunnion $B_1'$ of the frame $d_1$ extends into this drum and carries a blade R which stirs or agitates the liquid when rotation takes place. The resistance of the liquid may be further increased by ribs (not shown) upon the internal circumference of the drum T. When the system oscillates, the rings $d_1$ and $d_2$ perform oppositely directed rotary movements and energy is then destroyed in the drum T containing the liquid whereby oscillations are damped.

The advantages of the improved arrangement are thus the following:

The indications of the pointer $z$ are independent from the rotation of the earth and also from the speed of the vessel. An impact or impulse around the trunnions B would cause, when only one gyroscope should be provided, a deflection of the pointer $z$, while in the improved apparatus the indication remains unaffected. Finally, a damping of the oscillations of the pendulum around the trunnions A is attained by the friction around the trunnions B without the accuracy of the adjustment of the pointer *s* being detrimentally affected.

In the modified construction of the apparatus illustrated in the Figs. 5 and 6, a mirror *s* serving as an artificial horizon, is to be held horizontally in every direction. For this purpose, the said mirror is placed upon a system *b* which is suspended in the casing *a* by means of the cardan ring *c* and the cardan trunnions M M' and N N'. The centre of gravity of the system *b* is situated below the cardan point of suspension and is so adjusted that the mirror takes up a horizontal position when the gyroscopes are not running. The system *b* is provided with four gyroscopes $k_1$ to $k_4$ with vertical axes for stabilizing purposes. Each gyroscope is journaled in a ring or frame $d_1$ to $d_4$ fulcrumed around trunnions E, E' within the casing *b*. The gyroscopes revolve in pairs in opposite directions, the gyroscopes $k_1$, $k_2$ stabilizing the system around the axis M—M' and the gyroscopes $k_3$, $k_4$ around the axis N—N'. Any two gyroscopes belonging together act like the gyroscopes in the construction illustrated in the Figs. 1 and 2, and as their impulses compensate each other and as the arrangement of the gyroscopes is equal in pairs, the same advantages are obtained as explained with reference to the construction described with reference to the Figures 1 and 2.

In order that the gyroscope axes around the trunnions E, E' remain vertical, the centre of gravity of each frame *d* is preferably disposed below its point of suspension as clearly shown in Fig. 6. Other forces may however be employed for the purpose, for instance springs between the system *b* and the frames *d* and which bring the frames into the vertical positions. Such an arrangement of springs is illustrated in the Figs. 7 and 8 showing only the body *b* with the gyroscopes. The rings *d* are here suspended in their centre of gravity and rotatable around the trunnions E. The vertical position of the rings $d_1$, $d_2$, $d_3$, $d_4$ is attained by two springs $f_1$, $f_1'$, $f_2$, $f_2'$, $f_3$, $f_3'$ and $f_4$, $f_4'$ for each ring which are stretched between holders *h* fixed upon the inside of the casing *b* and the rings *d*. During the precessional movements around the axes E E', disturbing effects upon the system *b* need not be feared, because any two gyroscopes always perform opposite precessional movements and the tensions of the springs mutually compensate each other. The same is true for the friction momenta in the trunnions E, E' which are set up for the purpose of damping the oscillations. These are also in pairs equal and of opposite directions and thus balance one another. In order to increase the damping action, braking means may be disposed between opposite gyroscopes revolving in opposite directions such as are for instance illustrated in Fig. 4 and described in the specification.

The modified construction illustrated in the Figs. 9 and 10 solves the same problem, viz to keep a mirror *s*, which may for instance be employed as an artificial horizon, horizontally in a slightly different manner. The body *b* upon which the mirror *s* is mounted, floats within the casing *a* in a known manner and is centered by the pin $b''$. In order that the mirror *s* should remain horizontal, the center of gravity of the system is placed below the center of buoyancy of the body *b*. By means of this liquid suspension which naturally may also be employed in the other constructions of the apparatus, and as far as possible accurate and frictionless adjustment of the mirror is attained. The stabilization of the system *b* is effected by three similar gyroscopes $k_1$ to $k_3$ with horizontal axes which are disposed under angles of 120 degrees to one another. Viewed from the centre of the system, these gyroscopes rotate in the same direction. In Fig. 11 the diagram for the angular momenta of the three disks $k_1$—$k_3$ is represented, the angular momentum of the disk $k_1$ being marked $I_1$, the angular momentum of the disk $k_2$ being marked $I_2$, and the angular momentum of the disk $k_3$ being marked $I_3$. Fig. 11 corresponds to Fig. 9 viewed from above, and clearly illustrates that the graphic total of the three momenta results in a closed triangle, that is to say the graphic total of the angular momenta $I_1$, $I_2$ and $I_3$ equals zero, and therefore the earth rotation or the rapid movement of the vessel cannot cause a wrong positioning of the system.

Each gyroscope is journaled in a ring $d_1$, $d_2$, $d_3$ rotatable around vertical pins, P, P'. The gyroscopes are maintained in their normal positions by springs *f* which are stretched between the system *b* (by means of bows or hooks *g* fixed upon same) and the gyroscope frames *d*. In this manner, the gyroscopes may perform their precessional movements which are required in the horizontal plane and thus act to stabilize the system *b*. If, for instance, a disturbing impact is exerted upon the system around the axis A—A', the gyroscopes $k_1$ remains undisturbed, while the gyroscopes $k_2$ and $k_3$ perform opposite precessional movements in the horizontal plane. Hereby they set the springs *f* under tension in the same manner but in opposite directions, so that the system *b* is not disturbed.

Instead of placing the said springs between the frames of the gyroscopes and the system *b*, it would suffice to connect directly the gyroscope frames *d* by springs. It is only essential that the gyroscope axes should be elastically returned into their normal positions which form an angle of 120° between them.

The oscillations of the system *b* which must always be combined with precessional movements of the gyroscopes around the axes P, P', are damped by the friction which is produced by rotations around the axes P, P'. A wrong indication by the mirror s cannot take place, because the frictions act around the vertical axis and are furthermore oppositely equal. In order to increase the damping effect, special brake devices may also be provided in this construction, such braking devices being only diagrammatically indicated in Fig. 9. The three closed cylinders $v_1$, $v_2$, $v_3$ are filled with a liquid or a gas. They are firmly supported within the casing $b$. The pistons $y_1$, $y_2$, $y_3$ which are adapted to slide in the said cylinders, are displaced by the corresponding rings $d$ when these rings rotate around their trunnions P, P'. In this manner, energy is destroyed and the damping of the oscillations attained.

The advantage of this arrangement as compared with that described in Figs. 5 and 6, is that three gyroscopes suffice here, although more gyroscopes may always be employed, while in the construction according to Figs. 5 and 6 four gyroscopes are required. The construction according to Figs. 9 and 10 has all the advantages explained with reference to the construction illustrated in Figs. 1 and 2.

In the construction according to Figs. 1 and 2, the pendulum can only be employed for measurements in one direction viz vertically to the axis A—A'. It will therefore sometimes be favorable to eliminate the changes in the course of the vessel during the measurements. For this purpose, the apparatus may be combined in any well known and therefore not illustrated manner with a compass or a compass transmission which permanently maintains it in a fixed position. This will sometimes also be advisable when accurate measurements are required with the apparatus shown in Figs. 5 and 6.

It will be readily understood that I do not limit myself to the details of construction of the apparatus, and that these may be modified in many ways within the ambit of my claim without departing from the spirit of my invention or sacrificing any of its advantages.

What I claim as my invention and desire to secure by Letters Patent is:

Means for extending the period of oscillation of a pendulum comprising three equal gyroscopes having horizontal axes of rotation and resiliently mounted for turning relative to each other about vertical axes, said horizontal axes normally spaced at 120 degrees from each other, the rotation vectors of said gyroscopes traversing a triangle in the same direction.

In testimony whereof, I have signed my name to this specification.

MAX SCHULER.